United States Patent Office 2,736,175
Patented Feb. 28, 1956

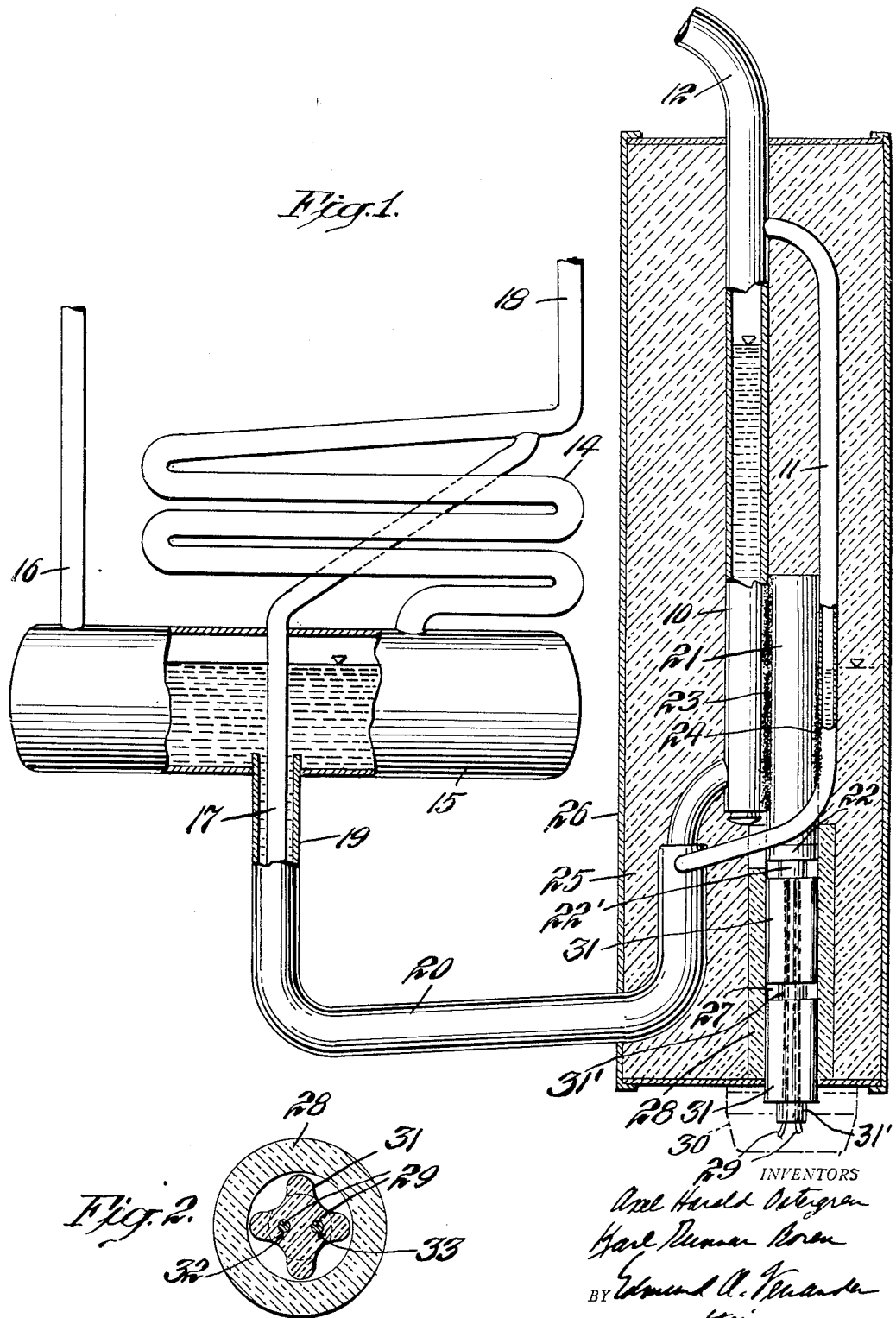

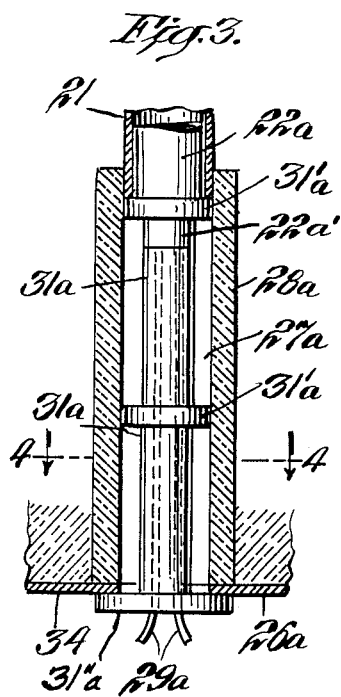
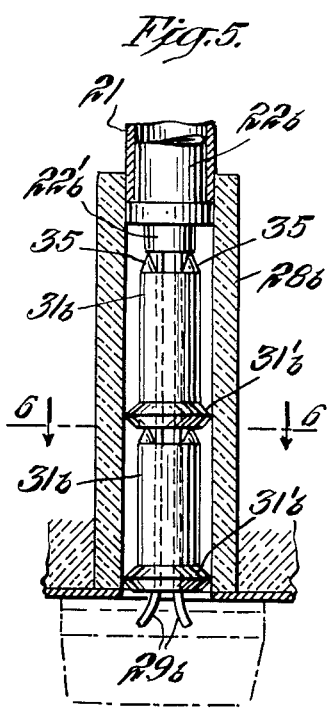
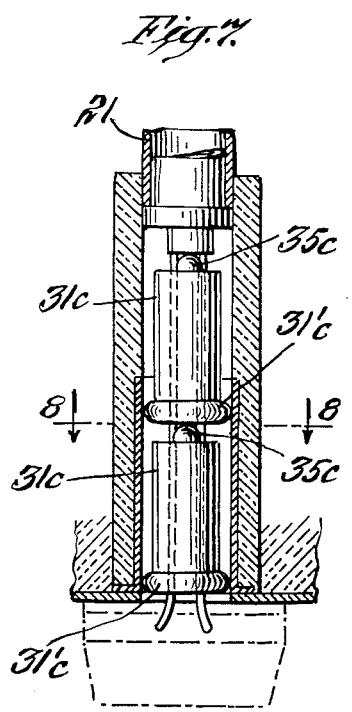
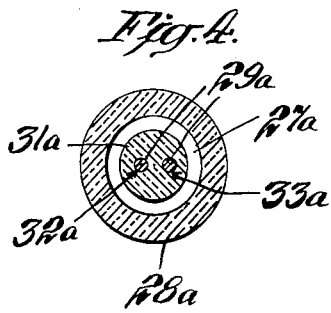
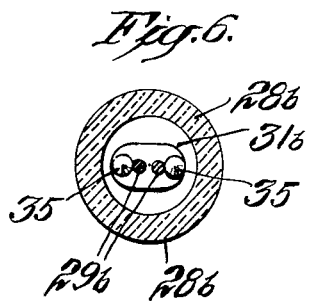
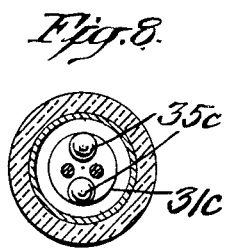

2,736,175

ELECTRICALLY OPERATED ABSORPTION REFRIGERATION APPARATUS

Axel Harald Ostergren and Karl Gunnar Borén, Stockholm, Sweden, assignors to Aktiebolaget Elektrolux, Stockholm, Sweden, a corporation of Sweden Application June 12, 1953, Serial No. 361,388

Claims priority, application Sweden June 20, 1952

13 Claims. (Cl. 62—119.5)

Our invention relates to electrically operated absorption refrigeration apparatus of the kind in which refrigerant vapor is expelled out of solution with the aid of an electrical heating element.

An object of our invention is to provide an improved electrically operated generator for absorption refrigeration apparatus of this type which is of simplified construction and requires a minimum number of parts.

Another object of our invention is to provide an improved insulation and heating unit for such a generator in which heat losses are at a minimum and the removable heating element is readily accessible for inspection or replacement.

The invention, together with the above and other objects and advantages thereof, will be more fully understood upon reference to the following description and the accompanying drawing forming a part of this specification, and in which:

Fig. 1 illustrates more or less diagrammatically an absorption liquid circuit of absorption refrigeration apparatus including a vertical sectional view of a generator embodying the invention;

Fig. 2 is a view, taken at line 2—2 of Fig. 1, to illustrate details more clearly;

Figs. 3, 5 and 7 are fragmentary vertical sectional views of generators of the general type shown in Fig. 1 illustrating further embodiments of the invention; and Figs. 4, 6 and 8 are views taken at lines 4—4, 6—6 and 8—8 of Figs. 3, 5 and 7, respectively, to illustrate details more clearly.

In Fig. 1 the invention is shown in connection with absorption refrigeration apparatus of a uniform pressure type containing an inert pressure equalizing gas. Refrigerant vapor is expelled from absorption liquid in a boiler pipe 10, and, together with vapor passing from the upper end of a vapor lift tube 11, passes through a conduit 12 to a condenser. The refrigerant vapor, such as ammonia, is liquefied in the condenser and flows into an evaporator in which the refrigerant evaporates and diffuses into an inert gas, such as hydrogen, to produce a refrigerating effect. The resulting gas mixture of refrigerant and inert gas flows from the evaporator to an absorber which may be of an air-cooled type including a coil 14 and an absorber vessel 15 to which the lower end of the coil is connected, such gas mixture entering the absorber vessel 15 through a conduit 16.

In the absorber refrigerant is absorbed from the gas mixture into absorption liquid, such as water, which is delivered thereto through a conduit 17, and the absorption liquid enriched in refrigerant passes into the absorber vessel 15. The inert gas is returned from the absorber to the evaporator in a path of flow including a conduit 18, and the enriched absorption liquid is conducted through a conduit 19 to the generator. In Fig. 1 the conduits 17 and 19 are essentially U-shaped and form a liquid heat exchanger 20, the conduit 17 being disposed within and extending lengthwise of the conduit 19.

The absorption liquid from which refrigerant vapor has been expelled, which is referred to as weak absorption liquid, flows from the lower end of boiler pipe 10 into one end of the conduit 17, the opposite end of which is connected to the upper end of the absorber coil 14. In order to simplify Fig. 1, the condenser, evaporator and connections therefor have not been shown, such parts being well known and their illustration not being necessary for an understanding of our invention.

The generator comprises a heating tube 21 which is heated by an electrical heating element 22 in a manner to be described more fully hereinafter. The boiler 10 and vapor lift tube 11 extend axially of the heating tube 20 and are secured, as by welding, for example, to the outer surface of the tube in good thermal contact therewith, as indicated at 23 and 24 in Fig. 1. One arm of the U-shaped liquid heat exchanger 20 extends vertically downward from the lower end of the boiler pipe 10, the inner conduit 17 of such liquid heat exchanger arm more or less constituting a downward projection or extension of the boiler pipe 10 which is parallel to and offset laterally with respect to the heating tube 21. The boiler pipe 10 extends upwardly from the generator and its upper end forms the conduit 12 through which expelled vapor passes to the condenser, as previously explained.

The right-hand arm of the conduit 19 is connected at its upper end to the lower end of the vapor lift tube 11. Due to the thermal contact of the lift tube 11 with the heating tube 21 at 24, absorption liquid is heated by heat derived from the electrical heating element 22 and raised to a higher level by vapor lift action into the upper part of the boiler pipe 10. Liquid weak in refrigerant flows by gravity from the boiler pipe 10 through conduit 17 to the upper part of absorber coil 14, as previously explained.

The parts of the generator thus far described and part of the liquid heat exchanger 20 are embedded in suitable insulating material 25 contained within a metal casing or shell 26. The heating tube 21, which is closed at its upper end and formed with an access opening at its lower end to receive the heating element 22, is vertically disposed in a central region of the body of insulating material 25 and the portions of the boiler 10 and vapor lift tube 11 in thermal relation with the heating tube are disposed at diametrically opposite sides thereof. The heating tube 21 is embedded in a section of the body of insulating material 25 which is intermediate the ends thereof and spaced from the top and bottom ends of the shell 26, and a passage is provided from an end of the shell 26 to the heating tube 21 for insertion and removal of the electrical heating element 22 into and from the heating tube.

In accordance with our invention the electrical heating element 22 is arranged to be positioned within the heating tube 21 through a passageway 27 extending upwardly from the bottom of the shell 26. The passageway 27 is defined by a hollow tube or sleeve member 28 which is embedded in the body of insulation 25 and formed of suitable insulating material like glass wool, for example. It will be noted in Fig. 1 that the lower end of the sleeve member 28 is positioned against the bottom of the casing 26 while the upper end thereof fits snugly over the lower open end of the heating tube 21.

The electrical conductors 29 for the electrical heating element 22 extend through the passage 27. The heating tube 21 snugly receives the heating element 22 which may comprise a cartridge housing the electrical heating element that generates heat when connected to a source of electrical energy. The electrical energy may be delivered through a supply line to a connecting or terminal block 30 to which the conductors 29 are also connected in any suitable manner.

In order to electrically and thermally insulate the electrical conductors 29 extending downwardly in the passage 27 from the heating element 22, a plurality of apertured bodies 31 are disposed in end to end relation in the passage. The apertured bodies 31 and electrical conductors 29 passing therethrough form a structure which is mechanically free from the heating element 22. As best shown in Fig. 2, the apertured bodies 31 are formed with a pair of spaced apart axially extending openings 32 and 33 through each one of which a single electrical conductor extends.

The apertured insulating bodies 31, which desirably are formed of a material like steatite, are of such shape that a relatively small area or region thereof is in physical contact with the inner surface of the hollow sleeve 28. In Fig. 2 it will be seen that limited physical contact of the bodies 31 with the inner surface of the sleeve 28 is essentially effected along axially extending lines at the outer extremities of the individual arms of the bodies. In Fig. 1 the lower end section 22' of the heating element 22, which is of smaller cross-sectional area than the main body portion of the heating element, bears against the upper end edge of the top apertured body 31. Each apertured body 31 is formed with an end section 31' of reduced size. In Fig. 1 the end section 31' of the top apertured body 31 is in abutting relation with the wider upper portion of the bottom apertured body 31. In this way the ends of the apertured bodies 31 are in limited physical contact with one another and the heating element 22.

The apertured bodies of insulating material may assume a variety of shapes and forms in accordance with our invention. Another form the apertured bodies may take is shown in Figs. 3 and 4 in which cylindrical-shaped apertured bodies 31a are provided with openings 32a and 33a through which the conductors 29a extend. The apertured bodies 31a are of smaller diameter than the hollow sleeve 28a, the top body 31a at its upper end bearing against the reduced lower section 22a' of the heating element 22a. The lower end of the top body 31a is formed with an enlarged band or ring section 31'a in physical contact with the inner surface of the hollow sleeve 28'. The lower end of the bottom body 31a is also formed with an enlarged band or ring section 31"a which is of greater diameter than the passage 27a and overlies and bears against the bottom end 34 of the shell 26a. The enlarged band 31"a at the lower end of the bottom apertured body 31a essentially forms a closure plate which may be removably secured in any suitable manner (not shown) to the bottom end 34 of the shell.

Another form the apertured insulating bodies may take is shown in Figs. 5 and 6. The cylindrical-shaped bodies 31b of Figs. 5 and 6 are formed with spaced apart axially extending openings for the electrical conductors 29b. Each body 31b is also provided with an enlarged band or ring-shaped section 31'b at the lower end thereof which in section is tapered in a radially outward direction, so that a relatively small area or region thereof will be in physical contact with the inner surface of the hollow sleeve 28b. Essentially, the extreme outer ends or apices of the bands 31'b provide a line to line physical contact between the sleeve 28b and a circumferentially extending region about the apertured insulating bodies 31b.

The main body portions of the apertured bodies 31b are of smaller diameter than the passage 27b and at the upper edges thereof are provided with a pair of relatively small ridges or projections 35 having pointed upper extremities. The apices of the ridges 35 of the top apertured body 31b bear against the reduced lower section 22'b of the electrical heating element 22b, and the apices of the ridges 35 of the bottom apertured body bear against the lower end of the top apertured insulating body. In this way a poor heat conductive path is provided axially of the insulating bodies 31b by reason of the limited physical contact between the ends of the insulating bodies and the extreme lower end of the heating element 22b.

The apertured bodies 31c of Figs. 7 and 8 are generally similar to the apertured insulating bodies 31b of Figs. 5 and 6 and differ therefrom only in the outer configuration or shape of the bands 31'c and the shape of the projections or ridges 35c. In Figs. 7 and 8 the outer extremities of the enlarged bands 31c are round or curved and the projections or ridges 35c are of semi-spherical form.

In the several embodiments illustrated and described, it will be apparent that the apertured insulating bodies in the passage of the hollow sleeve act against the lower end of the heating element and may be supported by a part of the terminal block fixed to the lower end of the generator shell, thus providing a simple arrangement for removably holding the heating element in position in the heating tube. Further, the apertured insulating bodies and electrical conductors passing therethrough form a structure which is flexible and non-rigid with respect to the heating element, thereby facilitating the insertion and removal of the heating element into and from the heating tube.

Although we have shown and described several embodiments of our invention, we do not desire to be limited to the particular arrangements set forth, and we intend in the succeeding claims to cover all modifications which do not depart from the spirit and scope of our invention.

What is claimed is:

1. In absorption refrigeration apparatus, a generator comprising an upright shell having a first end wall at one level and a second end wall at a higher level and an upstanding side wall connecting said first and second end walls, said shell having an opening at one of said end walls, and a single body of insulating material retained in said shell, a vertically extending heating tube having an access opening which is embedded in said body of insulating material and spaced from both end walls of said shell, said heating tube being formed of material having good heat conductivity and providing a heat transfer surface, a circuit for absorption liquid including a plurality of vertically extending conduits in which liquid therein is arranged to receive heat from said heating tube, one of said conduits serving as a boiler and another as a vapor-lift pump, an electrical heating element and electrical conductors therefor adapted to be connected to a source of electrical supply, a hollow sleeve enveloped in said body of insulating material which extends from the opening in said one end wall to the access opening of said heating tube to provide a permanent passage in said shell through which said heating element is movable for insertion into and withdrawal from said heating tube, the electrical conductors for said heating element extending lengthwise of said passage when said element is positioned in said heating tube, means for electrically insulating said conductors and thermally shielding the latter from the surroundings, said last-mentioned means comprising a plurality of apertured bodies of insulating material in end to end relation in said passage and through which the electrical conductors extend, said bodies and electrical conductors passing therethrough forming a non-rigid structure with respect to said heating element and which is freely insertable into and removable from the permanent passage in said shell through the opening in said one end wall, one or more of said apertured bodies in said passage having a relatively small area or region thereof in physical contact with the inner surface of said sleeve, and means including said bodies of insulating material, when the latter are in physical contact with the inner surface of said sleeve, for retaining said heating element in position in said heating tube.

2. Apparatus as set forth in claim 1 in which the space taken up and occupied by said apertured members in said passage is less than that defined by said hollow sleeve.

3. Apparatus as set forth in claim 1 in which the cross-sectional area of said apertured bodies is smaller at one region than at another region axially removed therefrom.

4. Apparatus as set forth in claim 1 in which a dimension of the cross-sectional area of an apertured body in said passage at least at one axially extending region thereof is substantially the same as a transverse dimension of said passage.

5. Apparatus as set forth in claim 1 in which a dimension of the cross-sectional area of an apertured body, at least at one axially extending region thereof disposed exteriorly of said passage, is greater than a transverse dimension of said passage.

6. Apparatus as set forth in claim 1 in which said apertured bodies are formed with a pair of spaced apart axially extending openings through each one of which a single electrical conductor extends.

7. Apparatus as set forth in claim 1 in which said hollow sleeve is formed of insulating material like glass wool, for example.

8. Apparatus as set forth in claim 7 in which the end of said shell having the opening serves to hold said hollow sleeve in position.

9. Apparatus as set forth in claim 1 in which the ends of said apertured bodies are in limited physical contact with one another and said heating element.

10. Apparatus as set forth in claim 1 in which said one or more apertured bodies in said passage are shaped so that a relatively small area thereof along essentially an axially extending line is in physical contact with the inner surface of said sleeve.

11. Apparatus as set forth in claim 1 in which said one or more apertured bodies in said passage are shaped so that a relatively small area thereof about a circumferential region provides essentially line to line physical contact with the inner surface of said sleeve.

12. Apparatus as set forth in claim 1 in which said one or more apertured bodies in said passage are shaped to provide an outwardly extending projection or ridge so that a relatively small area or region thereof is in physical contact with the inner surface of said sleeve.

13. Apparatus as set forth in claim 1 in which the opening in the shell is at the bottom end thereof and the access opening of said heating tube is removed from such bottom end, and said means for retaining said heating element in position in said heating tube includes said bodies of insulating material when in position in said passage and a part disposed exteriorly of said shell at the vicinity of the opening in said one end wall of said shell.

References Cited in the file of this patent

UNITED STATES PATENTS

| | | |
|---|---|---|
| 1,459,307 | Laise | June 19, 1923 |
| 1,594,087 | Arnold | July 27, 1926 |
| 1,720,586 | Allan | July 9, 1929 |
| 1,937,559 | Franklin | Dec. 5, 1933 |
| 1,984,486 | Lange | Dec. 18, 1934 |
| 2,096,093 | Drevet | Oct. 19, 1937 |
| 2,204,737 | Swallow | June 18, 1940 |
| 2,278,998 | Kogel | Apr. 7, 1942 |
| 2,288,899 | Gits | July 7, 1942 |
| 2,510,358 | Wolf | June 6, 1950 |
| 2,566,335 | Joerren | Sept. 4, 1951 |
| 2,587,916 | Squier | Mar. 4, 1952 |
| 2,624,829 | Dzaack | Jan. 6, 1953 |

FOREIGN PATENTS

| | | |
|---|---|---|
| 419,046 | Great Britain | Nov. 5, 1934 |
| 544,904 | Germany | Feb. 23, 1932 |
| 663,685 | Great Britain | Dec. 27, 1951 |